United States Patent Office 3,300,403
Patented Jan. 24, 1967

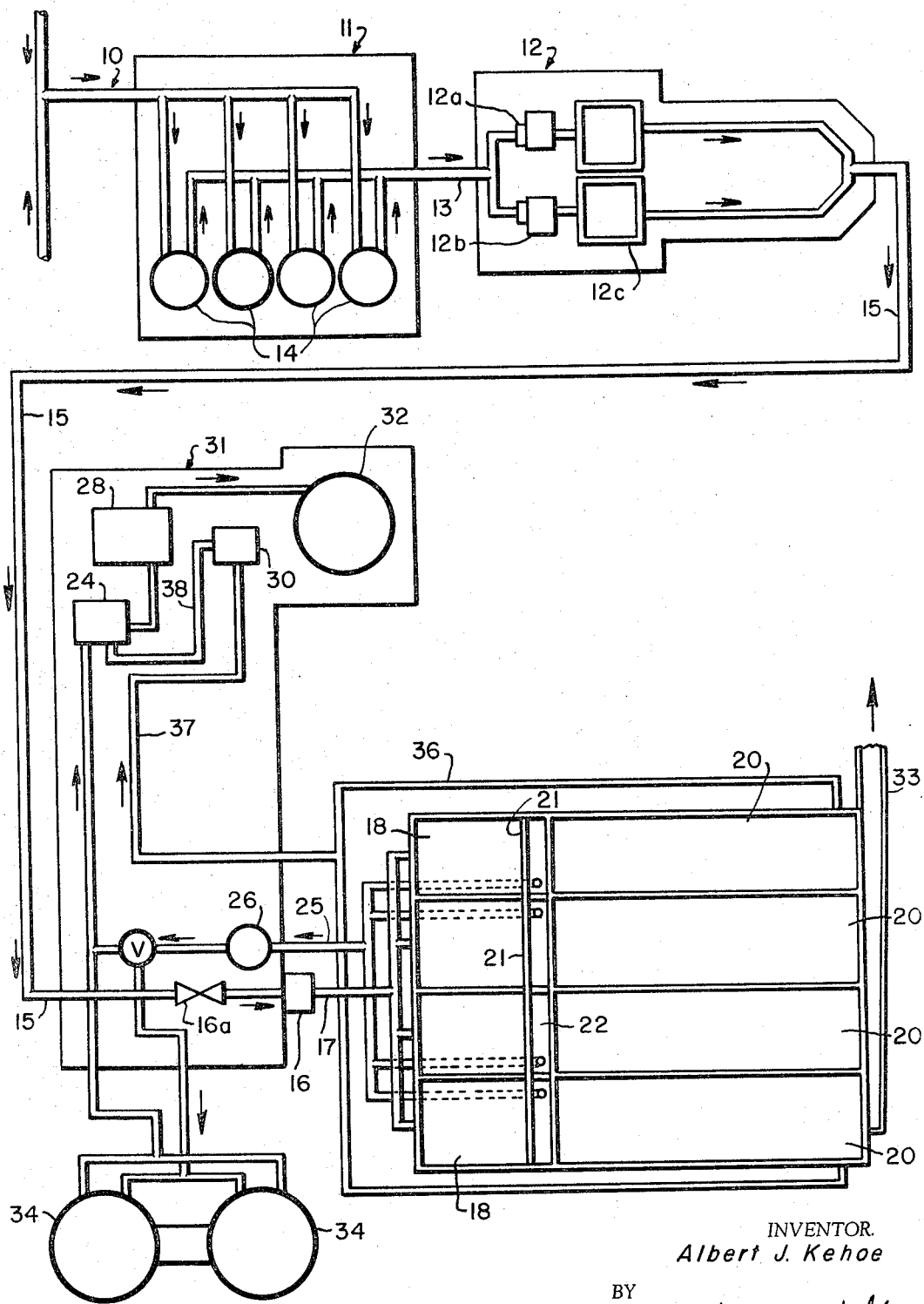

3,300,403
SEWAGE TREATMENT
Albert J. Kehoe, 1708 Union Ave.,
McKeesport, Pa. 15132
Filed Oct. 20, 1964, Ser. No. 405,185
11 Claims. (Cl. 210—10)

This invention relates to improvements in sewage treatment and relates in particular to a new and novel method for reducing the offensive odors at sewage treatment plants and for increasing the efficiency of sewage filtering processes.

Sewage processing consists essentially of the removing and disposing of solid materials from incoming raw sewage. A major portion of the finer solid materials is removed by conducting the sewage into a container where the flow rate is sufficiently low to permit a fraction of the finer solids to settle out into what is known as a sludge.

The finer solid materials of sewage and consequently the aforementioned sludge are largely organic substances that are particularly susceptible to putrefaction. If permitted to remain static for an extended period of time, such sludge undergoes organic attack known as acid digestion and forms what is known as a supernatant liquid which has a particularly offensive odor. A sludge is considered as being "fresh" until it commences to undergo such acid digestion. It is, therefore, highly desirable that the sludge or sedimentation be further processed or disposed of quickly and continuously to avoid highly offensive odors in the vicinity of the treatment plant.

One method of sludge treatment commonly practiced is to filter the sludge to convert it into a filter cake of lowered water content. The filter or sludge cake may then be conveniently dried, incinerated, buried or otherwise disposed of. This sludge, however, is a sticky, gummy mass containing about 95% moisture and is not readily filterable so that it is necessary to chemically treat sludge with a flocculating agent in preparation for filtration. Such treatment is not entirely successful since the sludge is not easily penetrated by a flocculating agent and, consequently, does not filter efficiently due to incomplete flocculation.

The failure of the solids in the settling tank to settle out to form a sludge of sufficient solids to be filterable frequently leads to the use of holding and thickening containers where the sludge is held for extended periods of time. Where the sludge is transferred to such containers for further thickening or settling, acid digestion and putrefaction are bound to occur, resulting in the generation of an offensive odor that is detactable for a considerable distance from the treatment plant.

Also, many sewage treatment plants shut down operating units, such as vacuum filters, over the weekend. However, sewage continues to flow through the equipment, and sludge remains static over an extended period of time. Such practice invariably leads to highly offensive odors which cause numerous complaints from residents living in relative close proximity to the sewage treatment facilities.

Additionally, grease and detergent slimes habitually buildup on the surface of raw sewage during sedimentation. These slimes are extremely difficult to dispose of. They may not be broken-up or caused to settle and cannot be conducted through the filter since they clog-up conduits and seal-off the filter so as to render it inoperable. One method of disposing of such slime is employing a furnace called a grease burner. Such operation is expensive and renders an undesirable odor.

I have found that if powdered coal, the major portion of which is rice size or smaller, is added to the sewage so as to be substantially uniformly distributed in the sludge, such sludge remains fresh for an extended period of time. Rather than deteriorating within several hours, such sludge has been held for periods of time that exceed forty-eight hours without giving off undue odors. Additionally, when the sludge so treated commences to become acid or septic (due to acid digestion) from remaining static for too long a period of time, I find it is possible to recirculate this sludge and add it to the incoming sewage to allow it to resettle with the fresh solids and such treatment freshens the deteriorating sludge so that it will keep for an additional extended period of time. I have found it possible to shut-down the filtering unit for the weekend and by recirculating the coal-containing sludge once during the weekend, I have been able to avoid any unduly offensive odors.

I have also found that the addition of powdered coal enhances the sedimentation or settling of the sewage solids, so that the need for using thickener tanks or holding tanks is largely eliminated. However, where such use is necessary, the resistance of powdered coal treated sludge to septic action or acid digestion makes it possible to employ these devices while reducing the offensive odors.

Further, I have found that by adding powdered coal to the sludge, the sludge itself exhibits considerably more body and is of greater porosity than the non-treated sludge so that it is more readily and completely chemically reacted with flocculating agents. As a consequence, this sludge filters far more efficiently than the non-treated sludge, and the yield of filter cake, or sludge cake per gallon of sewage treated is greatly increased.

Additionally, I have found it to be possible to draw-off the accumulated grease and detergent slime from the top of the sewage and conduct this material to a container where I add additional powdered coal while subjecting the slime to agitation. I fiind that the slime then breaks up and forms a sludge which may be added to the sludge of sedimentation prior to flocculation and filtration. By employing this method, the disposal of undesirable slime which constitutes a growing problem in the sewage disposal industry is efficiently and economically accomplished.

A further advantage of my invention is that the powdered coal addition remains in the filter cake, and if the filter cake is disposed of by means of incineration, such coal content enhances and accelerates the burning process.

The drawing consists of an illustrative flow sheet of a sewage treatment plant of the type utilized in employing the method of the present invention.

Although the representations of the flow sheet of the drawing are illustrative only, the general scheme is laid out as a top-plan view of an operating installation. Raw sewage is delivered via conduit 10 to the plant pumping station 11 which houses a wet well (not shown) which is a reservoir that collects and stores sewage so that a more even flow may be established through the treatment plant. The sewage is pumped from station 11 to a screen and grit building 12 by means of conduit 13 and pumps 14. In building 12, grinders 12a, bar screens 12b and grit collectors 12c remove heavy materials such as rags, stones, etc. The sewage flow retains sufficient momentum from the action of pumps 14 to carry it through building 12 and into a flash mixer tank 16 via conduit 15. Conduit 15 passes through the plant control and incinerator building 31. A venturi 16a controls the rate of flow. The sewage is mechanically agitated within mixer tank 16.

In the practice of my invention, powdered coal is preferably introduced into the flash mixer tank where it is throughly mixed with the sewage solids. To effect the desired results, I have found it to be preferable to employ about three-fourths of a ton of coal in a twenty-four hour period or in the treatment of about 4,500,000 gallons of sewage. This powdered coal is added to the tank 16 through conventional hoppers (not illustrated).

Although the use of flash mixer tanks, such as tank 16, are preferred, such mixers are not always employed. If flash mixer tanks are not used, then the coal is preferably introduced into the aeration chambers 18 of the settling tanks 20. In the event, however, aeration chambers are not employed, the coal can be added directly to the settling tanks 20. It is, of course, preferable to make the addition to the sewage prior to its entry into the settling tanks to be sure that the coal is well mixed with the settling solids.

The mixed sewage (solids plus coal and liquids) is conducted into the aeration chambers 18 of settling tanks 20 via conduit 17. The sewage flow retains sufficient momentum from the action of pumps 14 to carry it through building 12, mixer tank 16 and into chambers 18.

In the present embodiment, aeration chambers 18 are part of the sedimentation or settling tanks 20 and are separated from the sedimentation or settling portion of the tank by partial walls 21. Sewage flowing into aeration chambers 18 continues to flow into the sedimentation portion of the tank either over or under walls 21.

Air is introduced (or bubbled) through the sewage within the chambers 18 by means of a blower (not illustrated) and serves to make the liquid portion of the sewage lighter so that the solid portion will settle out more rapidly.

The sewage remains in the chambers 18 for an average time of about one-half hour and is within the balance of the tanks 20 for a period of from two to three hours. During this period during conventional operation, from 50 to 55% of the sewage solids settle to the bottom of the tanks to form the sludge. By adding coal to the flash mixer tank 16 in accordance with the present invention, about 70% of the solids settle to the bottom of the tanks 20.

A hopper 22 is positioned at the bottom of each tank 20 between the chamber 18 and the balance of the tank and underneath partial wall 21. Sedimentation occurring within each chamber 18 collects in each hopper 22 and sedimentation within the balance of each tank is conducted into hopper 22, or any sludge hopper of various design, by means of the flights of a conveyor or scraper system (not illustrated) positioned within each of the tanks 20.

The sludge which collects within the hoppers 22 may vary in its solids content as much as from 1% to 30%, by weight, balance liquids, but generally the solids will be present within the range of from about 1½% to 10%. Such variation is caused by outside influences such as weather, season, etc. Prior to my invention, sludge containing less than 3% solids was not filterable so that the use of holding tanks and thickeners was necessary. I have found that where powdered coal is added in accordance with the present invention, sludge containing only about 1½% solids can be readily filtered. Additionally, I find the solids content of the sludge, where the coal additions have been made, to be consistently higher than where such additions have not been made.

When my addition of coal is not made, the pH of the sludge within hoppers 22 ranges from about 5 to 5.1 indicating that this sludge is on the verge of undergoing acid digestion. When the addition is made, however, the pH remains at 5.5 or greater over an extended period of time. Without my addition, the sludge is a gummy mass which, though not highly odorous when fresh, does not keep more than a few hours before giving off an offensive odor. When my addition is made, the sludge contains more solids, is fresher and will keep for a considerably longer period of time (as long as 48 hours) without becoming unduly septic and giving off unwanted odors, and even after such an extended period of time, I find this sludge can be recirculated to the mixing tank 16 (or the aeration chambers 18) and conducted back into the settling tanks 20 to settle with the solids of the fresh sewage. The recirculated sewage is thus freshened and will keep for an additional extended period of time without giving off an unduly offensive odor. If coal is not first added to the sludge, in accordance with the invention, recirculation is ineffective to reduce the septic action and eliminate the undesirable offensive odors.

The sludge is conducted from hoppers 22 to a chemical conditioner tank 24 within building 31 by means of conduit 25 and pump 26. In the conditioner tank 24, the sludge is chemically treated with a flocculating agent so that the material may be dewatered by appropriate filtration. Such flocculating agents may be any of the known materials employed for such use as alum, ferric sulphate, ferric chloride and lime. We prefer to use a product manufactured by Dow Chemical Corporation, known as Polyelectrolytes. These flocculants must penetrate the sludge to make it amenable to filtration. Without proper flocculation, the sludge will not filter properly. In conventional practice where no coal has been added to the sludge, the tacky or gummy sludge is substantially impermeable and it is not possible to obtain effective chemical treatment (flocculation) and, consequently, it is not possible to effect efficient filtration.

After chemical treatment or flocculation in tank 24, the sludge is conducted to rotary drum vacuum filters 28 whereupon the treatd solids are substantially dewatered and converted into a filter or sludge cake. Such filter or sludge cake is then dried, incinerated (incinerator 32) or otherwise disposed of.

Effluent liquid overflowing from the weirs of tanks 20 is channeled by channel 33 to chlorinating tanks (not shown) from which it is discharged into a river or other body of water.

I have found that where the coal addition is not made, filter 28 yields approximately 2 to 3 lbs. of filter cake (dry weight) per square foot of filter surface. When the coal addition is made (approximately ¾ ton per 4,500,000 gal. of sewage), the filter substantially doubles this yield (5½ to 6 lbs./sq. ft.). The costs per ton (dry weight of filter cake) before using my invention was approximately $16 and after employing my addition, dropped to approximately $4.

In addition, prior to my invention, the filter cake contained 67 to 75% moisture but by employing the coal addition, the moisture content dropped to from 57% to 65%. Such a lower moisture content renders the filter cake easier to dry or incinerate.

The powdered coal employed in practicing the present invention preferably is rice size (about ⅛" diameter) or smaller. The crushed or powdered coal need not be of uniform consistency so long as a major portion (about half) is rice size or smaller. I have had good results by using what is known as "tailings" which is a discarded powdered coal or unwanted by-product of the coal industry and, consequently, its use is very economical. This powdered coal need not be of high quality and in fact is preferably ordinary bituminous coal but may be the more expensive and harder anthracite.

I have found that any addition of coal is effective in reducing the putrefaction tendency of a sludge so that there is no rigid lower limit. However, a minimum addition of about 35 pounds per hour in a plant treating about 4,500,000 gallons of sewage daily (about .0002 lb./gal.) is desirable to positively detect the advantageous results. An addition of about 60 to 80 pounds per hour is preferable. Amounts greater than about 150 pounds per hour (about .0008 lb./gal.) do not provide any additional significant benefits.

My coal addition may be made continuously or periodically. If made periodically, is should be of a frequency to assure distribution within the sludge. I have had success in making additions (40 lbs.) every one-half hour. Preferably, the frequency of addition will be at least equivalent to the detention time of the sludge within the aeration chamber.

Considerable difficulty is experienced in sewage disposal plants such as that presently described with slimes that form on the surface of the settling tank. Such slimes consist of grease, suspended or floating materials and the detergent content of the sewage which rises to the surface in these containers. Such slimes constitute a serious disposal problem since they block conduits through which they are conveyed and may not be filtered since they clog the filter and render it inoperative.

In accordance with the present invention, these slimes may be conveniently disposed of by periodically drawing them off the surface of the settling tanks 20 with a skimmer, rake, or other conventional apparatus, and conducting this material to a holding tank or sump 30 via conduits 36 and 37.

I have found that by adding powdered coal to the slime and agitating the mixture within the holding tank or sump 30, the slime precipitates as a sludge. This sludge may be returned to the settling tanks 20 (conduit not shown) where the sludge of tank 30 mixes with the sludge of hopper 22 which is then conducted to the chemical treatment container 24 and thence to filter 28, or such sludge may be conveyed directly to container 24 (via conduit 38) to be mixed with sludge from hopper 22. The sludge of sump 30 is preferably blended with the sludge of hopper 22 rather than being treated or filtrated separately.

The powdered coal that I add to the slime is the same as that I add to tank 16. Any quantity added has an advantageous effect, however, I find it necessary to add at least about .02 pound per gallon of slime to obtain a substantial conversion to the desired sludge. Additions as great as 2 pounds per gallon can be made, however, I have had particular success in employing about .10 pound per gallon.

Additionally, sewage treatment processes may involve flotation or pressure flotation wherein sewage is conducted into a vessel or container where it is treated to render the solids, or a fraction of the solids, hydrophilic so that they migrate to the surface and form a slime which may be removed in the manner of the grease and detergent slimes mentioned above. Such purposely formed slimes may also be treated with my coal addition in the manner of the grease and detergent slimes to convert these slimes into a filterable sludge.

Flotation may also involve settling where a fraction of the solids are caused to form a slime and the remaining fraction which is hydrophilic settles to form a sludge. In this practice, my coal addition may be made to the sewage in the flotation container to render the sludge fresh and amenable to filtration. Thus, my addition may be made to both the settling sewage and the floating fraction.

As previously stated, in the operation of sewage disposal plants, such as that presently described, it is frequently necessary to transfer the sewage solids from hopper 22 to sludge holding tanks or thickener tanks 34. I have found that by utilizing my invention and adding powdered coal to the solids, the enhanced settling renders the use of such tanks unnecessary. However, should it become necessary to employ such apparatus as the holding tanks or thickener tanks 34, if the sludge within these tanks is provided with a powdered coal content in the manner of the present invention, the solids or sludge will remain fresher for considerably longer periods of time than the untreated sludge. Additionally, where desired, the powdered coal may be added to the sewage in the holding and thickening tanks rather than being added to the sewage in the sedimentation tank. After an extended period in such tanks, the sludge may be recirculated with incoming raw sewage so as to resettle in a freshened condition.

My invention is concerned with the introduction of coal into sewage sludge as produced in a sewage disposal process. The apparatus employed in carrying out the method of the present invention are conventional and commercially available devices. Bar screens, flash mixer tanks, aeration tanks, settling tanks, conditioners, rotary drum vacuum filters, thickener tanks and holding tanks are all well-known and commercially available apparatus in the sewage industry. Suitable apparatus is described in in the publication "Chemical Engineers Handbook," Third Edition, McGraw-Hill Book Company, Inc., 1950. It will be appreciated that other equipment designed to effect the same processing as that described above may be employed in lieu of such specific devices. For example, a centrifuge filter of well-known construction may be substituted for the rotary drum vacuum filter. Also, some of the units such as the flash mixer tank and the aeration tank, although preferred, may be omitted. One or both of the latter devices is particularly desired to enable one to thoroughly mix the powdered coal with the incoming raw sewage.

It is also to be noted that the apparatus described above includes combination devices such as settling tanks or clarifiers which have sludge thickening devices incorporated therein.

Although the above specific embodiment relates to what is known as an intermediate sewage treatment plant wherein a minimum of 50%, by weight, of the sewage solids are removed, the invention is equally applicable to primary sewage treatment plants (35% removal), secondary sewage treatment plants (85% removal), or even complete treatment plants (95% removal).

While I have shown and described the preferred embodiments of my invention, it may be otherwise embodied within the scope of the appendent claims.

I claim:

1. A sewage treatment process wherein sewage is conducted into a first chamber and held until solids settle out to form a first sludge and said first sludge is then conducted to a second chamber where it is treated with a flocculating agent and is then conducted to a filter and is filtered and where a grease and detergent slime builds up on the surface of the sewage in said first chamber, the improvement in combination therewith of drawing said slime from the surface of the sewage in said first chamber and conducting it to a third chamber and adding powdered coal to said slime in said third chamber and agitating said mixture so as to form a second sludge and adding said second sludge to said first sludge prior to said treatment with a flocculating agent.

2. The method of claim 1 wherein powdered coal is also mixed with said first sludge prior to said treatment with a flocculating agent.

3. The method of claim 1 wherein powdered coal is added to said slime in amounts of from about .02 to 2 lbs. per gallon of slime.

4. In a sewage treatment process, the improvement in treating solids in the sewage which comprises,
  (A) mixing raw sewage as received with powdered coal,
  (B) separating the solids and liquids in the mixture of coal and sewage and removing the solids from the liquids,
  (C) adding a flocculating agent to the separated solids, and
  (D) filtering the solids after addition of the flocculating agent.

5. A sewage treatment process as set forth in claim 4 wherein said powdered coal is mixed with the sewage in the proportions of from about .0002 to about .0008 pound of coal per gallon of sewage.

6. A sewage treatment process as set forth in claim 4 wherein the solids are separated from liquids in the mixture of coal and sewage by flotation of the solids to the surface of the liquids and wherein the solids are removed by skimming them from said surface.

7. A sewage treatment process as described in claim 4 wherein the mixture of powdered coal and sewage is stored prior to separation and subsequently mixed with raw sewage and wherein the solids and liquids of the second mixture are separated.

8. A sewage treatment process as set forth in claim 4 wherein the solids are separated from liquids in the mixture of coal and sewage by flowing the mixture into a settling tank and allowing the solids to settle and wherein the solids are removed from the bottom of the tank.

9. A sewage treatment process as set forth in claim 8 in which the mixture of coal and sewage is aerated prior to flowing into a settling tank.

10. A sewage treatment process as described in claim 8 wherein grease and detergent slime is floated to the top of the liquids in the settling tank, removed from the top of the liquids, mixed with powdered coal in a separate vessel and subsequently filtered.

11. In a sewage treatment process wherein raw sewage is fed to a settling tank and wherein slim rises to the surface of the sewage in the tank, the improvement comprising,
(A) skimming the slime off of the surface of the sewage in the tank,
(B) feeding the skimmed slime to a second tank,
(C) adding powdered coal to the slime in said second tank and mixing the coal and slime, and
(D) filtering the mixture of powdered coal and slime.

References Cited by the Examiner

UNITED STATES PATENTS 1,617,014   2/1927   Derleth _____ 210—7

OTHER REFERENCES

Keefer, C. E.: Sewage-Treatment Works, First Edition, 1940, McGraw-Hill, pp. 109–113, 149 and 160–161.

Metcalf, L., et al.: American Sewerage Practice, vol. III, Disposal of Sewage, Third Edition, 1935, McGraw-Hill, New York, pp. 741–747.

Schmeitzner: Purification of Textile Wastes, Abstract appearing in Sewage Works Journal, July 1931, vol. 3, pp. 522–523, Original article in Gesundheits-Ingenieur 54, 315, May 16, 1931.

MORRIS O. WOLK, *Primary Examiner.*

MICHAEL E. ROGERS, *Examiner.*